(12) United States Patent
Udezue et al.

(10) Patent No.: US 10,970,683 B2
(45) Date of Patent: Apr. 6, 2021

(54) AUTOMATICALLY DETECTING AND STORING DIGITAL DATA ITEMS ASSOCIATED WITH DIGITAL CALENDAR ITEMS

(71) Applicant: Atlassian Pty Ltd, Sydney (AU)

(72) Inventors: Oji Udezue, Austin, TX (US); Michael Cannon-Brookes, Sydney (AU); Steen Andersson, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 0 days.

(21) Appl. No.: 16/773,904

(22) Filed: Jan. 27, 2020

(65) Prior Publication Data

US 2020/0160279 A1 May 21, 2020

Related U.S. Application Data

(63) Continuation of application No. 16/125,382, filed on Sep. 7, 2018, now Pat. No. 10,579,970.

(60) Provisional application No. 62/555,595, filed on Sep. 7, 2017.

(51) Int. Cl.
*G06Q 10/10* (2012.01)
*H04L 12/18* (2006.01)
*H04L 12/58* (2006.01)

(52) U.S. Cl.
CPC ....... *G06Q 10/1095* (2013.01); *G06Q 10/107* (2013.01); *H04L 12/1818* (2013.01); *H04L 12/1831* (2013.01); *H04L 51/043* (2013.01)

(58) Field of Classification Search
None
See application file for complete search history.

(56) References Cited

U.S. PATENT DOCUMENTS

| | | | | |
|---|---|---|---|---|
| 7,584,114 | B2* | 9/2009 | Estrada | G06Q 10/063118 705/7.23 |
| 2004/0143472 | A1* | 7/2004 | Estrada | G06Q 10/06313 705/7.23 |
| 2004/0168133 | A1* | 8/2004 | Wynn | G06Q 10/109 715/255 |
| 2004/0196313 | A1* | 10/2004 | Wynn | G06F 40/171 715/779 |
| 2004/0225718 | A1* | 11/2004 | Heinzel | G06Q 10/107 709/206 |
| 2005/0289202 | A1* | 12/2005 | S | G06Q 10/109 708/112 |

(Continued)

*Primary Examiner* — Leland Marcus
(74) *Attorney, Agent, or Firm* — Brownstein Hyatt Farber Schreck, LLP

(57) ABSTRACT

A computer-implemented method comprises, obtaining a digital calendar item for an event, determining, that the event has begun, and in response to determining that the event has begun, accessing a location and determining which of the participants are present for the event, determining, during the event, that one participant shared a digital data item with the other participants or as part of the event, and in response to determining that the participant shared the digital data item, at least transiently storing a reference or link to the digital data item, determining that the event has ended, and in response to determining that the event has ended, updating the digital calendar item by adding the reference or link.

20 Claims, 4 Drawing Sheets

(56) References Cited

U.S. PATENT DOCUMENTS

| | | | |
|---|---|---|---|
| 2009/0070678 A1* | 3/2009 | Landar | G06Q 10/109 715/733 |
| 2010/0114942 A1* | 5/2010 | Nelken | G06Q 10/109 707/769 |
| 2013/0036117 A1* | 2/2013 | Fisher | G06F 16/487 707/736 |
| 2015/0058324 A1* | 2/2015 | Kauwe | G06F 16/284 707/722 |
| 2015/0154291 A1* | 6/2015 | Shepherd | G06F 16/95 707/748 |
| 2015/0172330 A1* | 6/2015 | Kaplan | H04L 67/325 709/206 |
| 2018/0165621 A1* | 6/2018 | Guo | G06Q 10/06398 |

* cited by examiner

AUTOMATICALLY DETECTING AND STORING DIGITAL DATA ITEMS ASSOCIATED WITH DIGITAL CALENDAR ITEMS

BENEFIT CLAIM

This application claims the benefit under 35 U.S.C. § 120 as a Continuation of application Ser. No. 16/125,382, filed Sep. 7, 2018, which claims priority to U.S. provisional patent application 62/555,595, filed Sep. 7, 2017, the entire contents of both are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

The present disclosure generally relates to improved systems, methods, computer software and hardware in the field of enterprise productivity applications. The disclosure relates more specifically to improved computer-implemented systems and methods for automatically detecting and storing digital data items that are associated with digital calendar items or meetings that occur in response to digital calendar items.

BACKGROUND

The approaches described in this background section are not necessarily prior art to the claims in this application and are not admitted as prior art by inclusion in this section.

Computer programs implementing productivity applications are ubiquitous. Examples of productivity applications include word processing applications, email clients, spreadsheet applications, issue tracking software, calendar or scheduling applications, messaging applications, audio/video conferencing applications, and many others. Calendar applications or calendar functionality have become essential to the running of a modern business. Employees need to be able to schedule events, such as a meeting, with other employees, outside vendors, and other collaborators. Although much advancement has been made in other areas of productivity applications, calendar applications that improve the efficiency of scheduled meetings have seen only limited development.

For example, the calendar items themselves are simple and relatively static. Once a calendar item is created for an event, the item remains more or less static aside from RSVP information, despite the availability of digital data items, such as presented or shared documents, that relate to the scheduled meeting or event. A particular problem to be solved in the present invention is the inefficiency involved in a user searching for documents, messages, videos, recordings, or other digital content associated with a meeting that has occurred.

SUMMARY

This disclosure describes computer-implemented techniques for binding electronic documents, messages, chat room conversations, videos, recordings or other content to an event that is represented in a calendar item such as a meeting, based on detecting what content the participants in the meeting interact with during the meeting. For example, one approach involves obtaining a calendar item for an event, where the calendar item has time data, location data, and participant data for each of a plurality of participants. In response to determining that the event has started, the location data is used to determine which of the participants are present for the event. Retrieving account data or geolocation data for devices of participants could be used to verify location or presence. During the event, when a participant shares a content item with the other participants or with a meeting service, a reference or link to the content item is recorded. When the event ends, the calendar item may be updated to add the reference or link for all content items that were shared. Or, an event such as a video conference may occur separately from the calendar item yet could involve interactions with content items that are relevant to the calendar item; in such a case, the content items may be detected automatically and references to the content items may be updated in the calendar item.

In this manner, meetings or other events represented by calendar items automatically acquire references to materials that were used during the events represented in the calendar items or in other related events. Events or calendar items then may include an event name, identification of participants in the event, and an aggregation of all activities and references that occurred in the meeting. These techniques potentially greatly reduce the need for follow-up communications between participants to find the materials that were used. Furthermore, the techniques automatically consolidate virtually all electronic resources that were or should be associated with an event for rapid retrieval and use at times after the event.

In addition, the appended claims may serve as a summary of the invention.

DESCRIPTION OF EXAMPLE EMBODIMENTS

Figure 1:
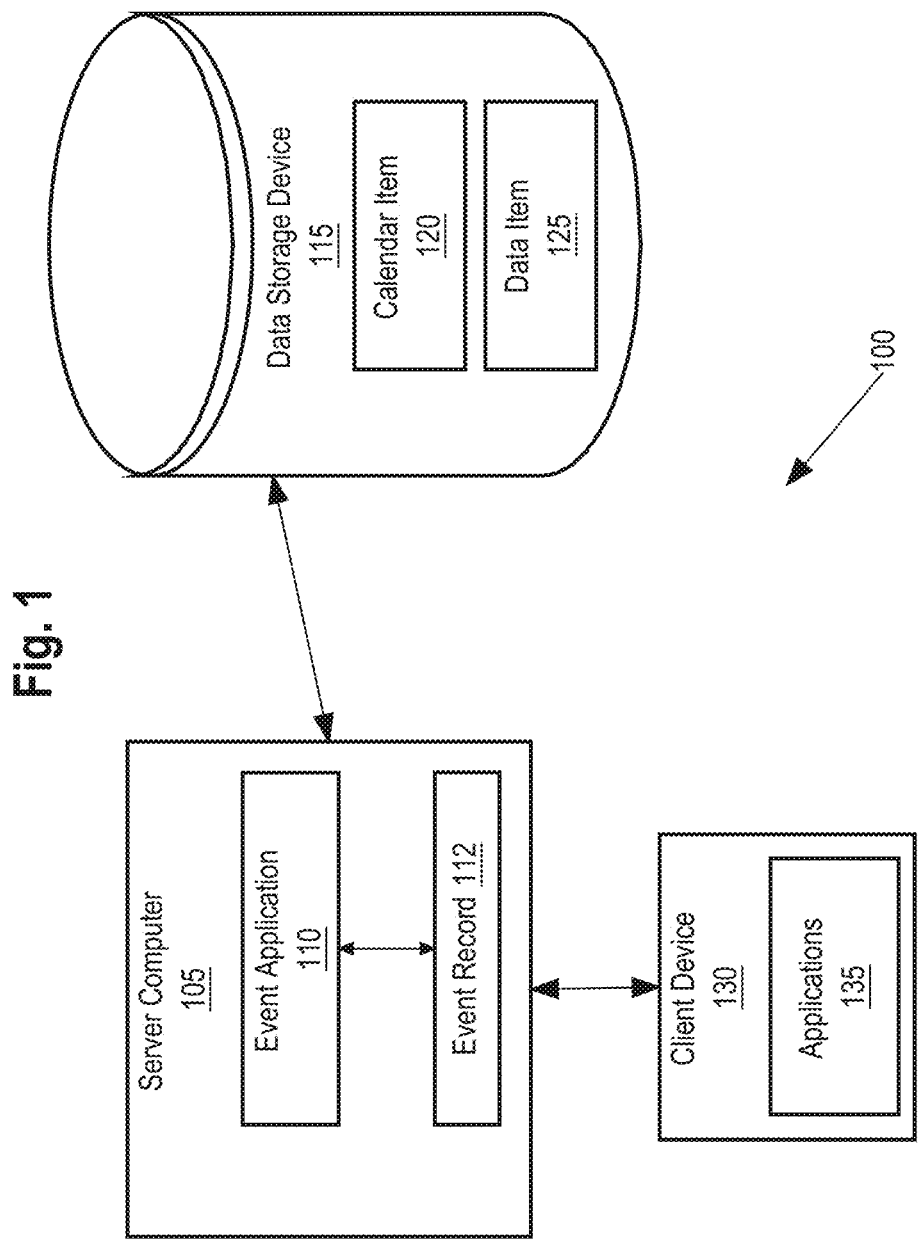
FIG. 1 illustrates a computer system in accordance with an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention. Embodiments are described in sections according to the following outline:

1. OVERVIEW
2. EXAMPLE SYSTEM IMPLEMENTATION
3. EXAMPLE FUNCTIONAL IMPLEMENTATION
4. IMPLEMENTATION EXAMPLE
5. IMPLEMENTATION EXAMPLE—HARDWARE OVERVIEW
6. EXTENSIONS AND ALTERNATIVES

1. OVERVIEW

Computer-implemented techniques are provided for automatically detecting and storing digital data items associated with calendar items. In one embodiment, a calendar item for an event is obtained. The calendar item may include time data, location data and participant data. Time data may comprise a start time and an end time for the event. The location data may identify a physical or virtual location where the event will be held. The physical or virtual location may comprise a video conference room or link, a virtual room in a video conferencing application, a phone number, an audio conferencing application or audio meeting location, any other application for sharing, viewing or editing of content across collaborators, or a room. The participant data may identify the participants who are invited to attend the event or included in the event; account identifiers, handles or user identifiers may be used in various embodiments. A calendar item may represent an event in a calendar application program or productivity application program. In other cases, an event may occur separate from a calendar item; for example, a meeting could be represented in a calendar item, but communication via video conference could occur separately and at a different time and physical or virtual place, yet involve content that is relevant to the meeting. Thus, an event may refer to any occurrence of communication between two or more computers, accounts or individuals that is facilitated in part by electronic communication. Examples include but are not limited to: a meeting, conference, seminar, set of e-mail messages or thread, forum postings, electronic chat messages, telephone or video conferences or calls, etc.

After determining the event associated with the calendar item has begun, for example, because the start time for the calendar item has been reached or because the scheduled meeting in the video conference application associated with the calendar item has been started by the moderator, location data and participant data associated with the calendar item may be accessed. For example, the assigned meeting in a video conference application may be accessed and a list of participants who have joined the video conference meeting or are shown as a meeting attendee on the calendar item may be accessed. During the event, data items that are shared, created, used, or otherwise accessed are detected and stored. Examples of data items include electronic documents, audio recordings, video recordings, chat logs, emails, screen sharing, identities of participants that attended the event, identities of participants that did not attend the event, metadata, etc. For example, a document shared on screen during a video conference meeting may be detected and stored. But the data items are not limited to those shared via a video conference or audio conference application, and may include items such as emails or chat messages exchanged between participants outside of a video or audio conference location associated with the event and documents created on other productivity application by event participants during the event, such as a sketch drawn on an electronic white board application. Further, data items may also be detected in the time immediately before or after the event, depending on settings that may be adjusted.

After the event is determined to be concluded, the data items stored during the event are processed. Processing may be done in parallel, may involve different steps or actions, and may be performed by different components, depending on the particular data item. For example, if one of the data items is a video recording or an audio recording, then the data item may be transcribed to generate a transcript. After the transcript is generated, the transcript may be updated to identify speakers using the participant data, add timestamps, add when participants entered or left the location associated with the event, add participant contact information, add links to shared data items and timestamps for when the data items were shared, add links to participant chat handles or email, metadata, or enrich the transcript in any other way. Additionally, the transcript, video recording, audio recording, or other data items may be used to identify tasks or action items assigned to participants or other individuals. Any identified tasks or action items may then be used to generate a ticket or data item in a project management application, issue tracking or other application, generate a new calendar item for the participant assigned the task or action, send notifications, or perform any other action.

As another example, if the data item is a document shared during the event, then any changes made to the document during the event may be identified, and multiple versions or views of the document may be generated, such as an original version, a modified version, and a list of changes. As another example, the collected data items may be filtered to reduce the total amount of data items or content and to keep the focus on the topic of the meeting. Thus, if ten data items were stored because of the event, the ten data items may be reduced to the most relevant three data items by filtering. Many other actions may also be taken, as discussed below.

After processing, the original calendar item is updated with any of the available data. For example, the participants may be updated to reflect who actually attended the event, when they arrived, and when they left. Further, the collected data items may be added, linked, or attached to the calendar item. Thus, the calendar item becomes a vastly more useful tool as the context and results of the event are made readily available to the participants, improving the results of the event. Alternatively, or in addition, the data items may be made available at another location. Further, notifications may be sent to the participants alerting them to the updated calendar item, or for any other reason.

Other aspects, features and embodiments will become apparent from the disclosure as a whole. Throughout the disclosure, the terms "data item" and "calendar item" refer to digital data that may be stored in electronic digital data storage devices and may be manipulated by computer processors and this disclosure is not intended to cover or claim abstract concepts. The described embodiments provide significant improvements to the usability of digital calendars and computing devices that interact with calendars and data items, in particular for automatically detecting and storing data items that are associated with calendar items or meetings that occur in response to calendar items. These techniques offer, in addition to improved user experience, reduced usage of network bandwidth, CPU cycles, storage, and/or memory because of the efficiency of the algorithms that are disclosed.

2. EXAMPLE COMPUTER SYSTEM IMPLEMENTATION

FIG. 1 illustrates an example computer system in which the techniques described may be practiced, according to some embodiments.

In one embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

The computer system 100 of FIG. 1 includes server computer 105, event application 110, data storage device 115, calendar item 120, data item 125, client device 130, and applications 135. In one embodiment, server computer 105 may be a multitenant service provider computer owned by, operated by, or associated with an application service provider that provides an online, real-time application program based upon software as a service (SaaS) environment that is used by or accessible to multiple tenants, and accessed using client computers coupled over one or more networks to server computer 105.

Alternatively, server computer 105 may be any computing device, and may be owned or operated on the behalf of a single entity, such as a behind the firewall server for a business. Server computer 105 is communicatively connected to data storage device 115 and client device 130 using any suitable wired or wireless connection, including, but not limited to: a Local Area Network (LAN), a Wide Area Network (WAN), the Internet, a company network, etc. Server computer 105 executes event application 110. Additionally, server computer may execute additional applications (not shown) in addition to event application 110.

In one embodiment, data storage device 115 may be any suitable storage device such as one or more hard disk drives, memories, or any other electronic digital data recording device configured to store data. Although data storage device 115 is depicted as a single device in FIG. 1, data storage device 115 may span multiple devices located in one or more physical locations. For example, data storage device 115 may be one or more nodes of one or more data warehouse(s). Additionally, in one embodiment, data storage device 115 may be located on the same device(s) as server computer 105. Alternatively, data storage device 115 may be located on a separate device(s) from server computer 105. Additionally, data storage devices may be located on each client device associated with a computing system, such as an enterprise or work computing system. Any combination of the above may be used.

Data storage device 115 may include one or more databases implemented using any suitable methodology, such as a relational database, a columnar database, etc. The database may be of any size, portioned into any number of rows, columns, or tables, and may be organized in any manner. In a multitenant embodiment, data stored on data storage device 115 may relate to any number of different tenants, such as hundreds to thousands of tenants or more depending on resource capacity and throughput. The data stored on data storage device 115 may relate to any type of data, such as chat or messaging application data, calendar application data, productivity application data, email application data, personal information, business information, governmental data, health data, environmental data, or police or military data. Individual data records may have any number of fields, components, or other aspects.

In one embodiment, data storage device 115 stores calendar item 120. Calendar item 120 may be created, used, accessed by, or otherwise associated with one or more applications or functionality within applications. For example, calendar item 120 may be associated with an email application with built in calendar or schedule functionality. Alternatively, calendar item 120 may be associated with a module or function of a chat application that enables calendaring or scheduling amongst the users of the chat client.

Further still, calendar item 120 may be associated with a web-based application that includes or provides calendaring or scheduling functionality. In one embodiment, event application 110 may provide calendaring or scheduling functionality, but this capability is not required. The calendar item 120 may be associated with, used by, or created by any application.

Calendar item 120 comprises a programmatic object, database record, dataset or record representing or associated with an event that has been created and stored. As mentioned above, the event may refer to any occurrence of communication between two or more computers, accounts or individuals that is facilitated in part by electronic communication, including but not limited to: a meeting, conference, seminar, set of e-mail messages or thread, forum postings, electronic chat messages, telephone or video conferences or calls, etc. Calendar item 120 may include any information needed by or useful to the invited participants of the event including, but not limited to: time data such as a date, a start time, and an end time, location data such as a video conference link, an audio conference link, a phone number, and a physical room number, participant data such as first name, last name, email address, chat handle, phone number, physical location, and other identifying information, attachments such as a document for discussion or reference, and an agenda. As discussed below, calendar item 120 is updated by event application 110 after the event has concluded to provide additional details about what transpired during the event and improve the results of the event.

In one embodiment, data item 125 may be any item or items of digital data. Any number of data items 125 may be stored by data storage device 115. Data item 125 may be a copy of digital data, an original of digital data, or may be a link to a location where a particular data item 125 may be accessed or is stored. A particular data item 125 is associated with a particular calendar item 120 by being created, modified, shared, used, or otherwise accessed by one or more participants during an event that is associated with a particular calendar item 120.

Additionally, a data item 125 may be created or modified after an event has concluded, such as by event application 110 as part of processing other data items 125. Thus, data item 125 may be any item or items of digital data including, but not limited to: Universal Resource Locators (URLs), a website, emails, chat logs, a text or short message service (SMS) message, an audio recording, a video recording, a transcript, a text document, a spreadsheet, source code, a slideshow, pictures or other images, electronic data file(s), metadata, etc.

Returning to server computer 105, in one embodiment, server computer 105 executes event application 110. Although depicted in FIG. 1 as a single standalone application, event application 110 may be one or more applications, plugins, and/or modules that execute on one or more computing devices. In some embodiments, application 110 is programmed or configured to obtain a calendar item 120 for an event. The calendar item may be obtained by accessing a database or data storage device where calendar items are stored. In other embodiments, obtaining and updating calendar items with references to data items, content items or media data may be performed by a program, process, service or other software element that is separate from the event application 110 and executes on the same server computer 105 or a different computer.

Alternatively, or in addition, the calendar item may be obtained when a participant or application notifies event application 110 of the calendar item 120, such as by inviting an alias associated with event application 110 as a participant of the event or by any other way. Event application 110 may automatically detect when a user creates a calendar item or receives a calendar item as an invitation to an event. Once obtained, event application 110 may process calendar item 125 to identify any needed information, such as a start date and time.

In other embodiments, multiple kinds of event applications 110 may execute on the server computer 105 or multiple computers, and each kind of event application may independently create event records 112 for events associated with that event application or may create and manage the calendar item 120. Or, multiple calendar items 120 may be created at different times and associated with one another via internal references or links. For example, a first kind of event application 110 could be a video conferencing application that creates event records 112 of video conferences that have been scheduled; the video conferences may be associated with or relate to a particular calendar item 120 using a link that is created by the first kind of event application, but are not necessarily represented by the calendar item. As a specific example, the calendar item 120 could represent a scheduled voice conference between Alice, Bob and Charles on Jan. 15, 2020, but the event record 112 could represent a video conference between Alice and Bob occurring on Jan. 5, 2020 in which Alice and Bob review an agenda for the January 15 meeting; thus, the calendar item and event record may be related, but need not represent the same real-word occurrence. Programmatic links, URLs, URIs or other references may be stored in an event record 112 to associate it with a calendar item 120.

Event application 110 is programmed or configured to determine that an event has begun and to access a location associated with the event. The determination that an event has begun may be made by comparing a current time, based on a system clock of the server computer 105, with the event start time in the calendar item. The location of the event may be accessed in any suitable manner. Event application 110 may be the host of a video conference or audio conference, may be invited as a participant, or may access the location using an Application Programming Interface (API), or other programmatic methods. Alternatively, event application 110 may access the location via a plugin or module of a different application running on a computing device of one or more participants of the event. If the event location is a phone number, the phone number may be dialed. Optionally, the location associated with the event may be accessed slightly before the event begins.

Event application 110 is programmed or configured to determine participants present for the event. The present participants may be determined in any suitable manner. For example, the participants may be identified using names, handles, or other identifiers entered when the participants accessed the location associated with the event or joined the event. These identifiers may be compared with the list of participants in the calendar item. Alternatively, or in addition, the identifiers may be compared with a contact list, such as a company-wide employee directory or other list, or contact lists of other participants. In this way, participants that are not listed in calendar item may be identified.

Additional information may be determined for the participants, such as a join time and a leave time, metadata, or any other information. In one embodiment, event application 110 may cause the present participants to be determined by another application, such as by an application hosting the event, and may receive the identified participants as data items in any format at any time.

Event application 110 is programmed or configured to detect and store media data and data items from the event. The media data and data items may be detected in any manner, and may be stored in any manner at any location. In particular, media data may be a video recording, audio recording, chat log, or any combination thereof. The media data may be recorded or collected in any manner, by any component, such as event application 110, a different application, or an application, plugin, or module executing on a computing device of a participant. The media data is itself a data item, and may be stored on data storage device 115 in any format. Data items may be detected by monitoring the actions of participants of the event, and creating copies of any data items created, shared, used, or otherwise accessed during the event.

Alternatively, or in addition, locations where the data items may be accessed may be identified and links to the data items may be stored. Optionally, the monitoring may continue for a short period before and/or after the event, so that additional data items may be collected. For example, an email may be detected and stored as a data item when the email is sent from one participant of an event to another participant of the event during the event, or in the time immediately before or after the event. As another example, documents opened or modified during a screen share may be detected and stored as data items. Likewise, if a participant of an event prints a document during the event, the digital version of the printed document may be detected as a data item and stored.

The quantity of information detected and stored by event application 110 may be adjusted by individual users, administrators, programmers, or other suitable entities as desired to ensure that the participants have an appropriate level of privacy. For example, the attributes that may be adjusted include, but are not limited to: the duration of detection, types of digital data files detected, a security or clearance level associated with digital data files may be considered, or any other way of tailoring the detection and storage of data items.

Further, all information detected and stored does not need to be included in any update of the calendar item. As discussed below, the stored information may be filtered to ensure that relevant items are included, and that irrelevant items are excluded. Optionally, approval by an author or approval by participants associated with a data item may be required before the data item is shared with other participants.

Event application 110 is programmed or configured to determine an event has concluded. The determination may be made in any suitable manner. For example, the determination may be based on the end time of an event occurring. Alternatively, the end time may be determined based on when one or more participants have left the location associated with the event, as indicated by location data associated with mobile computing devices. This approach may be appropriate when an event ends early or runs long. The determination is stored so that the actual end time of the event may be used to update the calendar item, as discussed below.

Event application 110 is programmed or configured to transcribe or cause transcribing of media data to generate a transcript. The transcription may be performed by event application 110, or may be performed by a separate application or service. For example, event application 110 may automatically send an audio or video recording to a transcription service, and receive a completed transcription back in an amount of time, such as one day. Regardless of how the transcript is generated, the transcript may be in any format, such as a text file.

Event application 110 is programmed or configured to update a generated transcript. The transcript may be updated with any available information. For instance, if speakers are identified in the transcript, the names of speakers may be checked against the known list of participants and corrected as necessary. If speakers are not identified, they may be added using available metadata or other data (such as by using timestamps and who a dominant or active speaker in a video recording was). Further, the names of speakers may be updated into clickable links that take users to contact information for the speaker, begin an email to the speaker, contact the speaker on a chat application, or take any other action.

As another example, the transcript may be updated to reflect the joining and leaving of participants or to reflect when certain data items were created, shared, modified, or otherwise accessed. Additionally, links to the data items may be inserted into the transcript at the appropriate time. If there is a chat log or other similar data in data items, then the chat log may be collated and included in the transcript, or made accessible from the transcript.

Event application 110 is programmed or configured to identify tasks assigned during an event and identify the participants to whom the task was assigned. The tasks assigned during an event may be identified from a transcript or from data items, including media data. The tasks may be identified using any method, such as by natural language processing or using keywords. For example, if a participant says, "Bill you need to get me this action item by Friday" a task for Bill may be "get action item by Friday." A due date may or may not be associated with a task, depending, for example, on whether a due date was included with the task. In the above example, the due date would be Friday. Once identified, the assigned tasks may be used to take other actions, as discussed below.

Event application 110 is programmed or configured to create new calendar items. The new calendar items may be created for one particular participant or for any number of participants. The calendar items may be created in any manner and for any reason. For example, if a participant has a task assigned to them during an event, then a calendar item may be created for that participant reminding them to complete their task by the assigned date.

Alternatively, or in addition, other actions may be taken by event application 110, such as creating an item or ticket in an issue tracking system, sending a notification or reminder, or any other suitable action. As another example, if a transcript includes the organizer of a meeting saying, "lets schedule a follow-up on the $23^{rd}$," then a new calendar item may automatically be created on the $23^{rd}$ inviting all participants.

Event application 110 is programmed or configured to filter data items. The data items may be filtered in any way. The stringency of the filtering may be adjusted by any suitable entity to ensure that only relevant data items are used to update the calendar item or are otherwise shown to participants. The filtering may be based on the content of the data items, the time of creation or use of the data item, the source of the data item, the destination of the data item (where applicable), a security or clearance level associated with the data item, metadata, or any other attribute. In general, event application 110 filters the data items to prevent irrelevant data items from cluttering storage and calendar items and to not waste the time of participants.

Event application 110 is programmed or configured to identify modifications made to data items during the event. Optionally, modifications made to data items shortly before or after an event may also be identified. The modifications may be determined by comparing a first version of the data item (such as when the data item was first stored) with a second version of the data item (such as when the data item was last stored). Alternatively, the modifications may be determined as the modifications are made to the data item, or functionality of a different application may be relied on to track modifications, such as a text editing application.

Due to the modifications, multiple versions of data items may be created. Any number of versions may be created, such as an original version without modifications, a final version with modification, and a delta version that shows the modifications made. Any number of versions of a data item may be stored and subsequently presented to the participants, as discussed below.

Event application 110 is programmed or configured to generate a summary of the event. The summary may include highlights or other notable moments from the event, such as tasks or action items assigned, conclusions reached, modifications to documents made, or any other available data. The summary may include timestamps and links to or copies of documents discussed. The summary may also include collating the stored data items or otherwise organizing the stored data items for easier retrieval and subsequent use.

Event application 110 is programmed or configured to update calendar items. The calendar items may be updated with any available information, such as data items, transcripts, and media data. The quantity of data items added to the calendar items may be adjusted by any suitable entity for any reason. The update may include attaching copies of data items, transcripts, or media data to the calendar item, adding links to data items, transcripts, or media data to the calendar item, adding participants who attended but were not originally listed, removing or noting participants who were invited but did not attend, including a summary, highlighting identified tasks and action items, or any other item.

Optionally, event application 110 may confirm or get approval from one or more participants before updating the calendar items with data items. For instance, if a document was emailed between two participants during an event, approval may be required from both participants before allowing the document to be shared with all participants. The parameters for requiring approval before adding data items to a calendar item may be based on any factor or factors, may be set by any suitable entity, and may be changed at any time.

Event application 110 is programmed or configured to send notifications. Notifications may be sent in any suitable manner or format, such as an email message or a chat message. Notification may be sent to any recipient for any reason. For example, participants in an event may be notified when the calendar item has been updated with additional data items, media data, transcripts, and the like. A participant, whether present in the event or not, who has been assigned a task may be notified of the task. Participants who were invited to the event but unable to attend may be notified of the results of the meeting, such as by sending a summary of the meeting or including all assigned tasks in the notification.

In one embodiment, server computer 105 may execute additional applications (not shown) besides event application 110. The additional applications server computer 105 may execute may provide any of the functionality needed to create, use, modify, or otherwise access calendar item 120 or data item 125. Further, the additional applications server computer 105 may execute may provide some of the functionality needed to process a data item 125, such as transcription, determining modifications to data items 125. Alternatively, as discussed above, event application 110, a third party, or other entity may provide these functionalities.

In one embodiment, client device 130 may be any computing device, including, but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Although not shown, client device 130 may communicate with data storage device 115 using any suitable method. Client device 130 may include applications, such as operating system software or application 135. Application 135 may be any application executing on client device 130 or accessed by client device 130. Application 135 may be used by event application 110 to provide some of the functionalities described above, such as by using a plugin, module, APIs, or other programmatic methods.

3. EXAMPLE FUNCTIONAL IMPLEMENTATION

Figure 2:
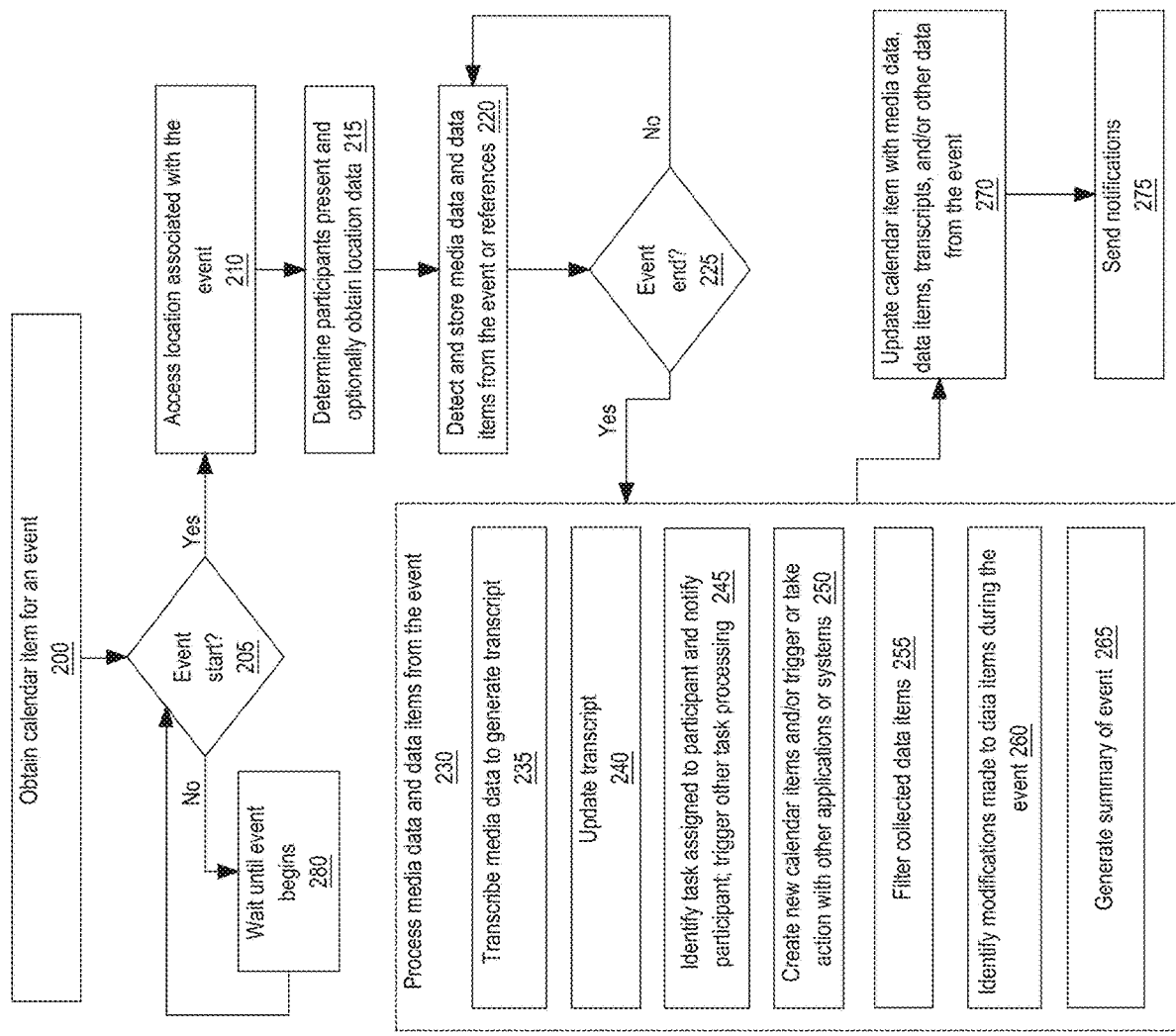
FIG. 2 illustrates a data processing algorithm or method in accordance with an embodiment of the invention.

FIG. 2 shows an example flowchart of a method automatically detecting and storing data items associated with calendar items.

Although the steps in FIG. 2 are shown in an order, the steps of FIG. 2 may be performed in any order and are not limited to the order shown in FIG. 2. Additionally, some steps may be optional, may be performed multiple times, or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 200, a calendar item for an event is obtained. The calendar item may be obtained from a source such as a database or a client computing device. The calendar item may have originally been created at any time by any application. Once obtained, data from the calendar item may be processed or otherwise extracted in any manner. The data may include, but is not limited to: a start date, a start time, an end date, an end time, a location, a subject, zero or more attachments, reference(s) content in a message associated with the calendar item or content in the body of the calendar item, invited participants, responses of participants (such as yes, no, maybe), participant data such as first name, last name, email address, phone number, chat handle, or any other data.

In step 205, a determination is made whether the event associated with the calendar item has begun. The determination may be implemented by executing a continuous background process or daemon that tests, each second for example, whether any calendar item stored in the system has started. The determination may be made based on comparing data from the calendar item, such as a start date and time, to values of a system clock of the server computer or host on which an event application is executing. The determination may optionally be made a few minutes prior to a start time.

Additionally or alternatively, the determination of step 205 may occur in response to a database trigger that has been configured against a particular column of a database that is updated when an event starts, where rows in a database table represent events, and the database table is managed in a database on data storage device 115 or accessible to server computer 105 over one or more networks. Or, the determination of step 205 may be made in response to receiving a programmatic event, notification or call from another application or system. For example, referring to FIG. 1, when a calendar item 120 is associated with an event occurring in an application that is separate from the event application 110, then when the event starts, the other separate application may transmit a programmatic notification to the event application specifying that the event started.

In an embodiment, if the event has started as indicated by the test of step 205, then the method proceeds to step 210. If the event has not started, then the method proceeds to step 280.

In step 210, a location associated with the event is accessed. One purpose of accessing the location is to permit collection of data items, content items, media data or references to them as the event is occurring. The location may include multiple different locations, any of which may comprise references to or identifiers of a phone conference call, a video feed, or a chat group. The location may be accessed by joining a video conference or audio conference as the host or a participant, or via a computing device of a participant of the event. The location may be determined from location data obtained from mobile computing devices of participants, or from external sources of location data. Location data also can be obtained from inbound email. The collection of data item 125 or a reference to the data item may be executed in several ways depending on the nature of the event. In one embodiment, the event application is programmed to detect that it, or another application, is being used to present, display or use a data item, content item or media data. For example, the event application may detect that a video conference application is being used to present a document, share a document, or record a meeting. Detection may be implemented using a listener process that programmatically hooks to interrupt handlers or to an event bus of another application. Detection also may comprise transmitting a parameterized URL, functioning as a query for data items, content items or media data that have been used, to a web service or to an online application that has implemented an API. Or, detection may comprise direct detection within the event application that specific presentation, sharing or recording functions have been invoked. Or, detection may comprise invocation of a function of the event application using a database trigger that has been configured on a column of a table in a database that represents the event, in an event application that is programmed to update the column when sharing a data item starts. Detection also may comprise detecting any digital data associated with a page, application etc. In another embodiment, the event application is programmed to detect that another application in use during the event is generating, presenting or sharing a data item. For example, a participant may exchange chat messages with others, receive documents shared over chat, receive emails with attachments, or create whiteboard drawings captured on electronic whiteboard application. In each case, the event application is programmed to detect the use of a data item, content item or media data, via a programmatic call, event listener process, interrupt handler or other programmatic connection to the other application, and to receive a link, identifier or copy of the data item, content item or media data in response. The other applications involved in these communications may include chat room applications, task management applications, issue tracking applications, incident management applications, project planning applications, email applications, drawing or graphics applications, word processors or collaborative document management systems, implemented as online web-based or SaaS applications and/or desktop applications.

In step 215, the participants who are present are determined. Step 215 may be performed continuously, or at regular intervals, until the event is over, so that any participants who leave early or join late may also be identified. In one embodiment, participants are identified by obtaining an account identifier, user identifier, handle or other identifier of a user or machine from an application program that manages the event. As one example, determining participants may comprise the event application accessing a list of user identifiers or account identifiers of users or accounts who are then currently logged into the event application and comparing those identifiers to the identifiers of participants who were invited to an event or included in a calendar item.

For another example, with a video conference, the event application may be programmed to query the video conference application with a request to report the identifiers of each user or account that has joined a particular video conference call, starting at the start time of the call and repeatedly at intervals during the call; one approach is to transmit a query each minute during the call to obtain a list of account identifiers or user identifiers for all participants that are then currently on the call. In one embodiment, the account identifiers or user identifiers that are obtained in this manner are added to a cumulative list, so that all participants who joined the call for at least one minute are captured in an event record. The use of a cumulative list permits collecting data items from all participants in an event even if one or more participants leaves the event before it ends.

In some embodiments, location services of mobile computing devices of participants may be used to report then-current locations of mobile participants. For example, FIG. 2 may be implemented in part using an application program or app for local installation on individual mobile computing devices of participants. When participants use the mobile app on a mobile device to join an event, the mobile app may query a location service of the operating system of the mobile device and report location data as part of step 215.

In step 220, media data and data items from the event are detected and stored, either as references or links, or as copies. Media data may include a video recording, an audio recording, chat logs, and the like. Data items may include any electronic file or other digital data that is created, modified, shared, used, or otherwise accessed during the event. Examples of data items include, but are not limited to: URLs, a website, emails, chat logs, a text or SMS message, an audio recording, a video recording, a transcript, a text document, a spreadsheet, source code, a slide presentation or deck, a slideshow, pictures or other images, electronic data file(s), metadata, etc. Obtaining links or copies may be implemented using programmatic calls to other applications, or parameterized URLs that are transmitted as queries to web services, or by directly obtaining a link to a resource that was specified or used within the event application.

Optionally, data items that are created, modified, shared, used, or otherwise accessed within a specified amount of time before or after the event may also be detected and stored. The specified amount of time may be stored as configuration data and updated using administrative functions of the event application. The media data and data items may be stored using object references, pointers, links, URLs, URIs or copies in any of a database a repository system, or a publicly or privately accessible server or any combination thereof. Copies of the media data and data items may be stored, or links to locations where the media data or data items may be stored, depending on preferences and settings.

In step 225, a determination is made whether the event has ended. The determination may be based on an end time of the calendar data item, or may be determined based on when most, or all, of the participants have left the location associated with the event. Or, the determination may occur in response to a programmatic call, interrupt, or other signal from another application or within the event application. Or, the determination may occur in response to invocation of code in the event application from a database trigger that is configured on a column of a table in a database that represents the event and that is updated when the event ends. If the event has not concluded, the method returns to step 220 and continues to detect and store media data and data items. If the event has concluded, the method proceeds to step 230.

In step 230, the stored media data and data items are processed to extract information from the items or to use them to improve distribution efficiency. As indicated by the dotted lines, the individual steps within step 230 may be performed in parallel or at different times, by different computing devices or the same computing device, and using different applications, a single application, a third-party service, or any combination thereof. Further, each of the steps within step 230 are optional, and may or may not be performed depending on settings, what data items were stored, what media data was stored, or any other factor. Generally, upon completion of processing relevant media data and data items have been identified and/or created so that the calendar item maybe updated with the relevant information in step 270. In an embodiment, the event application 110 (FIG. 1) is programmed to perform one or more of the steps within step 230 based upon configuration data or by options selected by a user or administrator.

In another embodiment, step 230 may comprise automatically tracking, via clickstream data or other data representing actual user interaction with applications or devices, the activity of participants and using the activity data to identify resources to associate with an event. For example, clickstream data may indicate launching an application such as a word processor, presentation application or media player, and accessing a particular file; in response, data identifying the file and/or application may be associated with the event.

In step 235, media data is transcribed to generate a transcript. Any media data may be used to generate a transcript, such as a video recording, an audio recording, or a combination thereof. The transcript may be generated in any manner, such as by a transcription application, utilizing a third-party transcription service, or any other method. The generated transcript may include added information, such as identification of speakers, whether by actual name or by generic identification (such as male voice, female voice, speaker1, speaker2, etc.).

In step 240, the transcript is updated. The transcript is updated using available information from the media data, data items, and calendar item. Any data may be added to the transcript to enrich and improve the usability of the transcript. For example, participant data from the calendar item or other sources may be used to update or correct the names of speakers in the transcript. The names of speakers can also be updated to clickable links that direct users to a chat message or email message addressed to the speaker. As another example, if there are chat logs, the chat logs or content of the chat logs could be included and collated with, or otherwise made accessible from, the transcript.

Additionally, any shared data items could be noted when the data item was detected, and a link provided to access the associated data item. Timestamps for when participants joined or left may also be added. Thus, the transcript becomes immensely more useful as the entire context of the event is made evident and accessible from the transcript. Any other updates may be made and any available data may be used to update the transcript.

In step 245, tasks assigned to participants are identified. Optionally, the participants may be notified. The tasks may be identified from media data, a transcript, a chat log, data items, and/or any other source. The tasks may be identified using natural language processing, keywords, or any other method. In addition to identifying tasks, the participant associated with the task, as well as a due date (when applicable) may also be identified. The identified tasks, participants, and due dates may be stored in any suitable location in any manner or format.

Furthermore, in an embodiment, the process of FIG. 2 is programmed to transfer data for tasks to other processes in addition or as an alternative to updating a meeting object. For example, task data may be copied to a master page that records all meetings of a particular user for a period. Or, the process of FIG. 2 may be programmed to trigger an auditing operation, an archiving operation, an issue tracking operation or other process or workflow based on the task data. In this manner, the process of FIG. 2 is programmed to make a meeting part of a larger workplace ecosystem or a larger federated productivity application set, by using meeting data and exporting it to other applications to launch actions of those applications.

In step 250, new calendar items are created and/or the process triggers or takes action with other applications or systems. For example, a new calendar item may be created for a particular participant, for a subgroup of participants, or all participants. Any number of new calendar items may be created. The calendar items may be created based on the tasks identified in step 245. For example, if a task was assigned to Jane that was due Tuesday, a new calendar item may be created for Tuesday morning to remind Jane of the task. As another example, calendar items may be created based on data besides the tasks identified in step 245, such as directly from the transcript, media data, chat logs, or other source. For example, if someone says " . . . schedule a follow-up meeting in a week," a new calendar item may be created for next week as the follow-up. Alternatively, any other source or reason may be used to create new calendar items.

In some embodiments, step 250 may comprise executing API calls, executing other programmatic calls, transmitting data and/or triggering action by other applications. Examples of triggering action may include creating issues in an issue tracking system; creating tasks in a productivity application; or creating lists in a document management system. API calls or other programmatic calls may include any of the collected data items, or links or references, as payloads or parameters.

In step 255, collected data items are filtered. The collected data items may be filtered in any manner using any method. The data items are filtered to reduce irrelevant data items and to present participants with the data items that are most likely to be relevant. Further, the filtering increases the privacy of the participants by removing irrelevant data items. Any parameters may be used to filter the data items, and the parameters of the filtering may be adjusted at any time by any suitable entity.

In step 260, modifications made to data items during the event are identified. The modifications may be identified in any manner. The modifications may be identified by comparing a first version of a data item, such as when the data item was first stored, with a second version of the data item, such as when the event ended or when the data item was no longer in use during the event. Alternatively, the modifications may be identified as the modifications are made, such as by relying on another application to track the modifications. As part of identifying modifications, multiple versions of data items may be used or created, such as a first version without modifications, a second version with modifications, and a delta version that identifies the changes made.

In step 265, a summary of the event is generated. The summary of the event may be generated using any stored or otherwise available information, including transcripts, media data, data items, and calendar items. The summary may be generated in any manner, such as through natural language processing or other methodologies. The summary may be of any length and settings associated with the summary, such as length or types of information included, may be set at any time by any suitable entity.

In step 270, the calendar item is updated with media data, data items, transcripts, summaries, and/or other data from the event. Any amount of data from the event may be used to update the calendar item. The calendar item may be updated in any way, such as by modifying the subject or body of the calendar item, adding attachments, adding links, removing participants, adding participants, and any combinations thereof.

In step 275, notifications are sent. Step 275 is optional, and may not be performed. The notifications may be sent for any reason, in any manner or format, to any recipient. For example, notifications may be sent to alert participants that the calendar item has been updated. As another example, notifications may be sent to invited participants who were unable to attend, so that they may determine what happened at the event.

In step 280, the method waits until the event begins, and returns to the determination at step 205.

Using the above method, the usability and efficiency of calendaring, scheduling, and events may be vastly improved. Events may be streamlined and made more productive. For example, there may no longer be a need to take notes during an event, since a transcription or summary may be provided. Further, because tasks or action items may be identified, the results of the event may be dramatically improved as participants remember what they are supposed to do and follow through quicker.

Additionally, the calendar item itself becomes a meaningful tool for a participant to remember what transpired during an event because the entire context of the event is made accessible by updating the calendar item to include data items, transcripts, media data, etc. In contrast, "traditional" calendar items are static and provide no assistant to a participant attempting to remember what transpired during an event. Further, the above method may reduce the usage of computing power, memory, and/or bandwidth by consolidating data items and making the data items easily available to participants. Further, the overall usability and functionality of the computing device and associated applications is also greatly increased.

4. IMPLEMENTATION EXAMPLE

Figure 3:
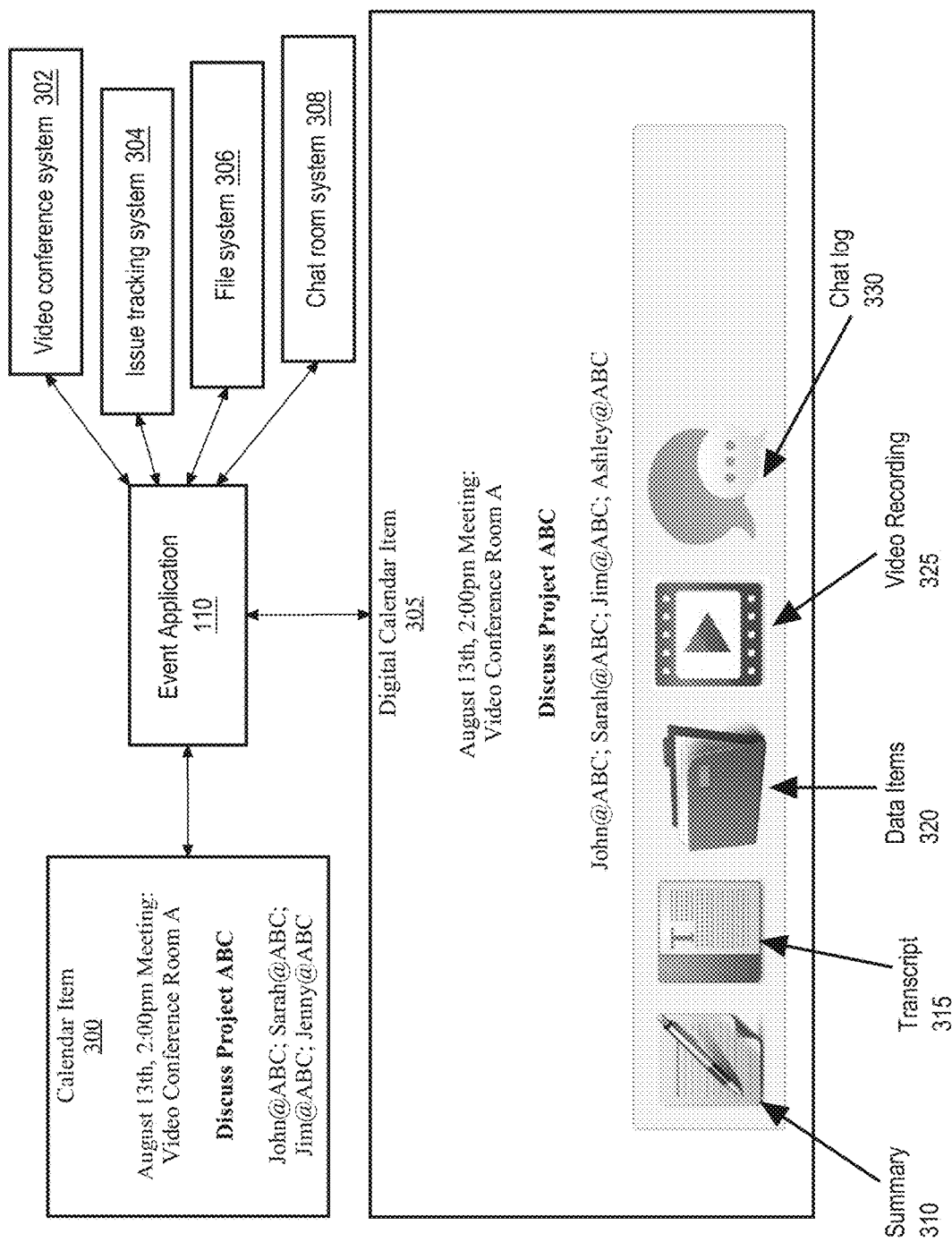
FIG. 3 illustrates example digital calendar items in accordance with an embodiment of the invention.

FIG. 3 illustrates an example calendar item from a method for automatically detecting and storing data items associated with calendar items.

FIG. 3 shows a calendar item before an event begins and after the event has concluded and the calendar item has been updated. In this example, the event is a work meeting that was conducted using a video conference. Unfortunately, one of the original participants—Jenny—was unable to attend the meeting but sent Ashley, a coworker, in her place. During the meeting, a chat application was used to send a few messages and share URLs that were discussed. Additionally, multiple text documents were shared, discussed, and modified, emails were sent, and Jim was assigned a task.

Calendar item 300 shows the original calendar item with basic information. The subject of the meeting is identified as "Discuss Project ABC," and a time and date for the meeting are identified: "August 13$^{th}$ at 2:00 pm." Additionally, Video Conference Room A is identified as the location (and a link is provided to access the video conference itself), and the four participants are identified by their email addresses: John, Sarah, Jim, and Jenny. Without using the methods discussed in this document, after the meeting concluded calendar item 300 would not be updated, and would simply sit on the participants respective calendars. If John, Sarah, Jim or Jenny (who was replaced by Ashley) needed to remember what the outcome of the meeting was, they would need to rely on their own notes or memories. Jim forgets the task assigned to him during the meeting and the overall results of the meeting were mediocre at best. Another meeting will need to be held.

In sharp contrast to the above, updated calendar item 305 has been updated using event application 110 and the methods discussed in this document, and provides the full context and results of the meeting. This greatly improves the efficiency, functionality, and usability of calendaring and scheduling applications and for events or meetings as well. Updated calendar item 305 is updated after the conclusion of the meeting. In updated calendar item 305, the participant list has been updated to reflect the fact that Jenny was unable to attend, and Ashley attended in her place.

Further, updated calendar item 305 now includes summary 310, transcript 315, data items 320, video recording 325, and chat log 330. Summary 310 was generated using transcript 315, data items 320, and chat log 330. Summary 310 includes a brief summary of the meeting, and identifies the task assigned to Jim. Transcript 315 includes a complete transcript of the meeting, and was generated using video recording 325. Transcript 315 has also been updated to accurately identify each speaker, and to allow the names of speakers to be clicked to easily send that person a chat message. Further, transcript 315 identifies when data items 320 were shared, and links to the associated data items are provided.

Data items 320 are the data items shared during the meeting. Multiple versions of each data items 320 are included, so that the original version, final version, and the modifications made during the meeting are easily accessible. Video recording 325 is a recording of the video conference. Chat log 330 is a log of the chat that occurred during the meeting.

It will be apparent that the techniques of this disclosure provide numerous benefits including reducing the use of computer CPU cycles, storage, memory and network bandwidth that otherwise would be consumed for multiple participants in an event to request and obtain copies or references to data items that were accessed, shared or presented during the event. As one specific example, after a video conference that was scheduled in a calendar item with multiple participants using a calendar application, and in which one participant has shared a set of presentation slides that are stored in a file or deck, there is no need for the participant to e-mail a copy of the deck to all other participants. Instead, the techniques of this disclosure make it possible for the calendar application to automatically access the presentation and to associate a link or copy with an updated version of the calendar item. Consequently, after the video conference, any participant may access the updated version of the calendar item to rapidly obtain the presentation.

5. IMPLEMENTATION EXAMPLE—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired or program logic to implement the techniques.

Figure 4:
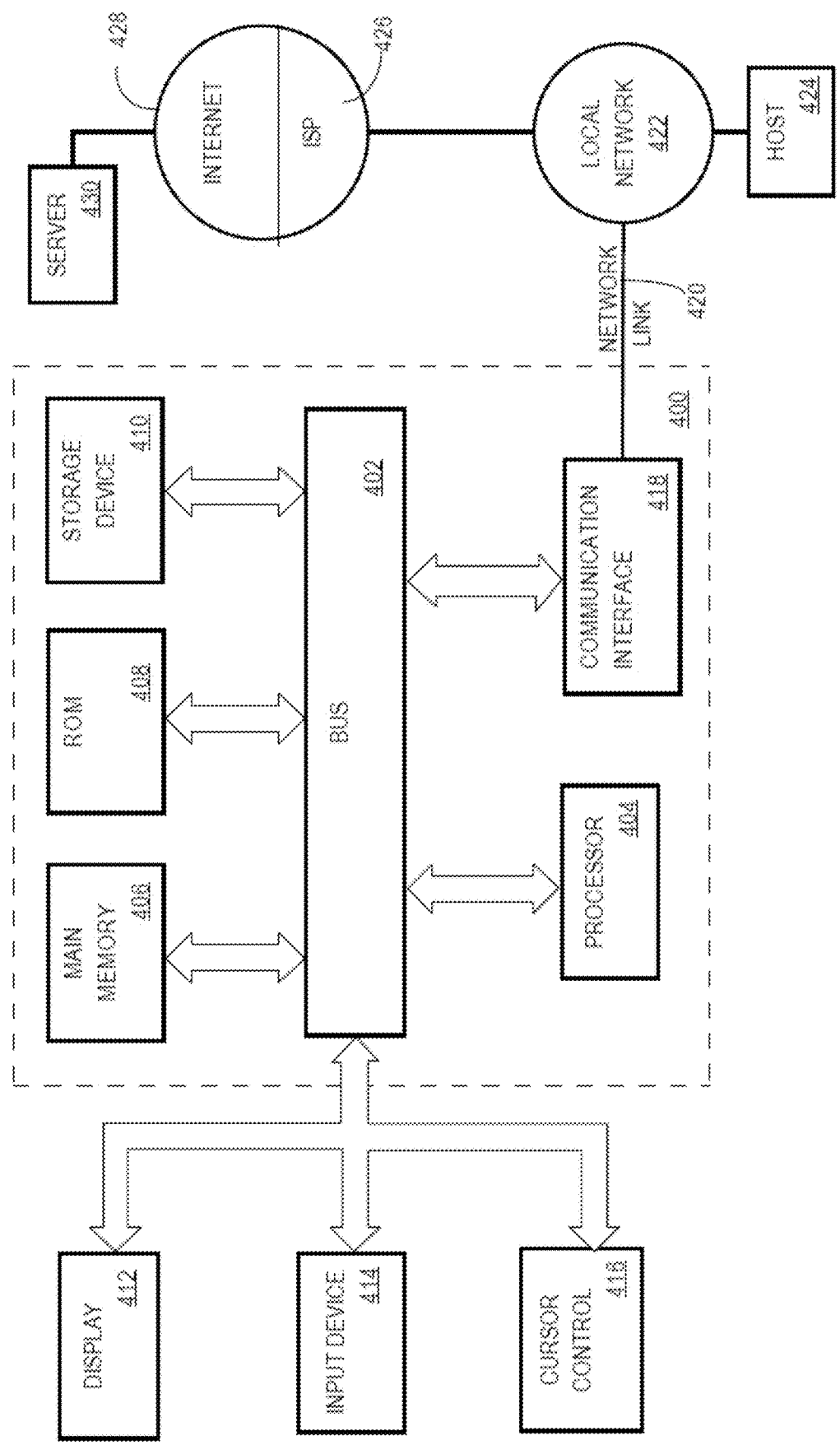
FIG. 4 shows a block diagram of a computer system with which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, or stored in storage device 410, or other non-volatile storage for later execution.

What is claimed is:

1. A computer-implemented method comprising:
obtaining a digital calendar item for an event, the digital calendar item comprising time data, location data that includes an identifier that specifies a location of a phone conference call, a video feed, or a chat group associated with the event, and participant data for each of a plurality of participants;
determining, using the time data, that the event has begun, and in response to determining that the event has begun, using the location data to access the location of the phone conference call, the video feed, or the chat group associated with the event and determining which of the plurality of participants are present for the event using participant data that is associated with participant accounts or participant digital computing devices;
determining, during the event, that one participant shared a digital data item with the other participants as part of the event, and in response to determining that the participant shared the digital data item, at least transiently storing a reference or link to the digital data item;
determining that the event has ended, and in response to determining that the event has ended, updating the digital calendar item by adding the reference or link to the digital data item;
identifying a task assigned to a particular participant of the plurality of participants;
updating the digital calendar item to add the task that is assigned to the particular participant.

2. The computer-implemented method of claim 1, further comprising notifying the particular participant of the task.

3. The computer-implemented method of claim 1, further comprising:
creating and storing a media data object comprising one or more of video data or audio data of the event;
causing transcribing the media data object to generate a transcript;
wherein the task is identified based on the digital data item or the transcript.

4. The computer-implemented method of claim 1, further comprising creating, for the particular participant, a new digital calendar item for the task.

5. The computer-implemented method of claim 4, wherein the task includes a due date; wherein the new digital calendar item for the task is created based on the due date.

6. The computer-implemented method of claim 1, wherein the digital data item is shared by the participant outside of the location associated with the event.

7. The computer-implemented method of claim 1, further comprising causing generating, based on the task, a particular digital data item in a software application.

8. The computer-implemented method of claim 7, wherein the particular digital data item comprises an issue in an issue tracking system.

9. The computer-implemented method of claim 7, wherein the particular digital data item comprises a task in a productivity software application.

10. The computer-implemented method of claim 7, wherein the particular digital data item comprises a list in a document management system.

11. A system for initializing test environments for different versions of a software product, the system comprising:
a processor,
a communication interface, and
a non-transitory computer-readable storage medium storing sequences of instructions, which when executed by the processor, cause:
obtaining a digital calendar item for an event, the digital calendar item comprising time data, location data that includes an identifier that specifies a location of a phone conference call, a video feed, or a chat group associated with the event, and participant data for each of a plurality of participants;
determining, using the time data, that the event has begun, and in response to determining that the event has begun, using the location data to access the location of the phone conference call, the video feed, or the chat group associated with the event and determining which of the plurality of participants are present for the event using participant data that is associated with participant accounts or participant digital computing devices;
determining, during the event, that one participant shared a digital data item with the other participants as part of the event, and in response to determining that the participant shared the digital data item, at least transiently storing a reference or link to the digital data item;
determining that the event has ended, and in response to determining that the event has ended, updating the digital calendar item by adding the reference or link to the digital data item;
identifying a task assigned to a particular participant of the plurality of participants;
updating the digital calendar item to add the task that is assigned to the particular participant.

12. The system of claim 11, further comprising notifying the particular participant of the task.

13. The system of claim 11, further comprising:
creating and storing a media data object comprising one or more of video data or audio data of the event;
causing transcribing the media data object to generate a transcript;
wherein the task is identified based on the digital data item or the transcript.

14. The system of claim 11, further comprising creating, for the particular participant, a new digital calendar item for the task.

15. The system of claim 14, wherein the task includes a due date;
wherein the new digital calendar item for the task is created based on the due date.

16. The system of claim 11, wherein the digital data item is shared by the participant outside of the location associated with the event.

17. The system of claim 11, further comprising causing generating, based on the task, a particular digital data item in a software application.

18. The system of claim 17, wherein the particular digital data item comprises an issue in an issue tracking system.

19. The system of claim 17, wherein the particular digital data item comprises a task in a productivity software application.

20. The system of claim 17, wherein the particular digital data item comprises a list in a document management system.

* * * * *